June 24, 1930. A. G. CARTER 1,765,402
WHEEL OR PULLEY FOR BAND SAWS
Filed July 20, 1929
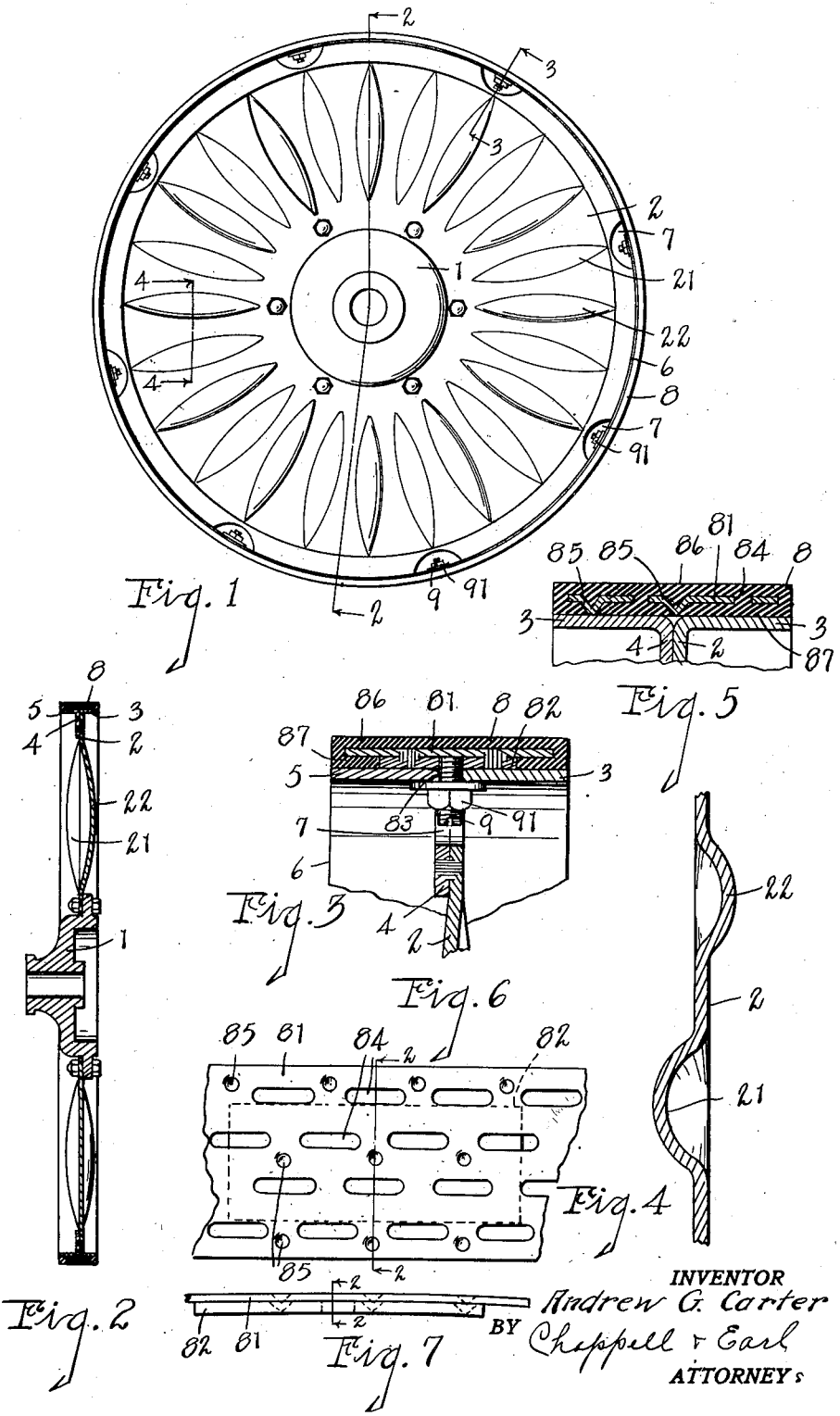

Patented June 24, 1930

1,765,402

UNITED STATES PATENT OFFICE

ANDREW G. CARTER, OF GRAND RAPIDS, MICHIGAN, ASSIGNOR TO THE CARTER PRODUCTS COMPANY, INC., OF GRAND RAPIDS, MICHIGAN

WHEEL OR PULLEY FOR BAND SAWS

Application filed July 20, 1929. Serial No. 379,689.

This invention relates to an improved wheel or pulley for band saws.

The object of the invention is to provide an improved balanced sheet metal band saw of proper rigidity and strength formed with a web of a single sheet of metal with special rim formation; also to provide an improved structure therefor.

Objects pertaining to details and economies of construction and operation will definitely appear from the description to follow.

A preferred embodiment of my improved band saw wheel is illustrated in the accompanying drawing, in which:

Fig. 1 is an elevation view of a band saw wheel embodying the features of my invention.

Fig. 2 is a vertical detail sectional view on line 2—2 of Fig. 1.

Fig. 3 is a detail sectional view on line 3—3 of Fig. 1 showing the details of the rim formation and the attachment of the tire.

Fig. 4 is an enlarged detail sectional view on line 4—4 of Fig. 1, showing the alternate struck-up radial ribs.

Fig. 5 is an enlarged detail cross section of the rim and tire on line 2—2 of Figs. 1, 6 and 7.

Fig. 6 is an enlarged detail developed plan of a part of the tire core band, the cushion being omitted.

Fig. 7 is an elevation of the parts appearing in Fig. 6.

The parts will be identified by their numerals of reference which are the same in all the views.

1 is the metal hub of the wheel. 2 is the web of the wheel which is provided with alternate radial struck up rib portions 21, 22 elliptical in form extending from the hub well out towards the periphery. Because of their alternate arrangement, they provide a web which is very stiff and true. The web 2 extends to the periphery of the wheel and is turned into a flange 3 forming half of the flat rim.

The remaining portion of the rim is carried on a ring 4 and is in the form of a flange 5 thereon, which completes the flat metal rim 6. The ring 4 is spot welded to the face of the web 2. At intervals semicircular portions 7 are cut out of the disk of the wheel at the periphery within the rim 6.

The tire 8 comprises a perforated core band 81 with attaching and core supporting plates 82 spot welded thereto on the inner side and with central screw threaded bore 83. The tire is secured in place by means like that described in my co-pending application consisting of the stud screw 9 bottomed in said bore 83 with a clamping nut 91 thereon.

The core band 81 is perforated with, preferably, longitudinal slots 84 which are disposed in staggered relation to each other or in diagonal lines laterally across the said band.

Between the perforations at each side and centrally, are inwardly struck projecting points 85, see Fig. 5, which are adapted to contact with the rim 6 and cooperate with the supporting plates 81 to maintain the said core band in a true circle and evenly spaced from the said rim 6.

Rubber cushion 86, 87 is vulcanized outside and inside the said core, filling the inner spaces around the said supporting plate 82 and extending through the perforations to form a complete vulcanized tire very firmly secured to the said wheel.

Having thus described my invention, what I claim as new and desire to secure by Letters Patent, is:

1. A band saw wheel comprising a hub, a sheet metal disk web with radial ribs struck up in opposite directions alternating with each other to give rigidity to the web of the wheel, the periphery being turned into a flange forming part of the rim, a sheet metal ring secured to the front of the said web by spot welding and with a flat peripheral flange completing the said flat metal rim, with cut away openings within the rim, and a cushion tire with supporting plates and screws in the said cut away openings retaining the same in place.

2. A band saw wheel comprising a hub, a sheet metal disk web with radial ribs struck up in opposite directions alternating with each other to give rigidity to the web of the wheel, the periphery being turned into a flange forming part of the rim, a sheet metal ring secured to the front of the said web and with a flat peripheral flange completing the said flat metal rim with cut away openings within the rim, and a cushion tire with supporting plates and screws in the said cut away openings retaining the same in place.

3. A band saw wheel comprising a hub, a sheet metal disk web with radial ribs struck up in opposite directions alternating with each other to give rigidity to the web of the wheel, the periphery being turned into a flange forming part of the rim, a sheet metal ring secured to the front of the said web by spot welding and with a flat peripheral flange completing the said flat metal rim, and a cushion tire with supporting plates and screws retaining the same in place.

4. A band saw wheel comprising a hub, a sheet metal disk web with radial ribs struck up in opposite directions alternating with each other to give rigidity to the web of the wheel, the periphery being turned into a flange forming part of the rim, a sheet metal ring secured to the front of the said web and with a flat peripheral flange completing the said flat metal rim, and a cushion tire with supporting plates and screws retaining the same in place.

5. A band saw wheel comprising a hub, a sheet metal disk web with radial ribs struck up in opposite directions alternating with each other to give rigidity to the web of the wheel, the periphery being turned into a flange forming part of the rim, and a sheet metal ring secured to the front of the said web by spot welding and with a flat peripheral flange completing the said flat metal rim.

6. A band saw wheel comprising a hub, a sheet metal disk web with radial ribs struck up in opposite directions alternating with each other to give rigidity to the web of the wheel, the periphery being turned into a flange forming part of the rim, and a sheet metal ring secured to the front of the said web and with a flat peripheral flange completing the said flat metal rim.

7. A band saw wheel comprising a hub, and a sheet metal disk web with radial ribs struck up in opposite directions alternating with each other to give rigidity to the web of the wheel, the periphery being turned into a rim flange.

In witness whereof I have hereunto set my hand.

ANDREW G. CARTER.